Nov. 22, 1927.

P. M. R. SALLES

STATIC CONVERTER OF CURRENT

Filed June 4, 1925

Patented Nov. 22, 1927.

1,650,470

UNITED STATES PATENT OFFICE.

PIERRE MAX RAOUL SALLES, OF CAUDERAN, FRANCE, ASSIGNOR TO COMPAGNIE FRANCAISE THOMSON HOUSTON, OF PARIS, FRANCE, A CORPORATION OF FRANCE.

STATIC CONVERTER OF CURRENT.

Application filed June 4, 1925, Serial No. 34,978, and in France June 14, 1924.

The present invention relates to a transformer system for the static transformation of alternating electric current available generally for domestic electric illumination into absolutely continuous current suitable for the supply of valves for wireless reception, for electrolysis, etc. The system consists in causing alternating current to circulate suitably in a thermo-electric pile, the hot junctions of which are of much smaller section than the cold junctions, or afford for any reason a greater electric resistance.

This pile is composed of two parts coupled in parallel; the alternating current being supplied to the middle of each part, the ends of which constitute the two terminal poles supplying continuous current.

Figure 1:
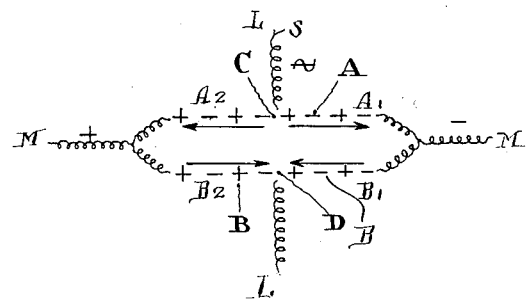

Fig. 1 of the annexed drawing shows diagrammatically the operation of the device. The thermo-electric elements are indicated by the signs plus and minus, the plus sign indicating the positive electrode and the minus sign the negative electrode. A and B denote the two series which are connected together at the ends, being connected at the left hand end by the two terminal positive electrodes and at the right hand end by the two terminal negative electrodes, which constitute respectively the positive and negative poles of the continuous current. The alternating current is supplied at the middle of each series at C and at D. This current over one period circulates in the direction of the arrows shown in the drawing, and in the opposite direction during the succeeding period. The current is of opposite direction in each half part of the series A and B. The positive and negative ends are thus at the same potential relatively to the alternating current.

If the hot junctions of the series A and B are of smaller section than the cold junctions, their resistance being greater, the quantity of heat which will be produced in the former will be much greater than that which will be produced in the other. There will thus exist a difference in temperature between these junctions which will produce an absolutely continuous thermo-electric current, which will not affect the alternating current since the two ends of the pile are, with regard thereto, at the same potential.

Figure 2:
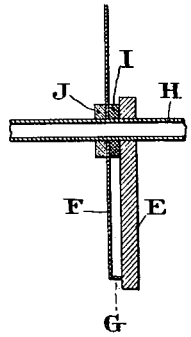

By way of example only Fig. 2 of the drawing shows in section full-size one of the thermo-electric elements (copper sulphide alloy, nickel-copper) of sufficient dimensions to heat the filaments of a wireless four-valve station.

The positive electrodes E of cast and moulded copper sulphide are prismatic bars formed with a cylindrical perforation. The negative electrodes F of nickel-copper alloy consist of thin sheets of this alloy formed with a cylindrical hole similar to that of the electrodes E. The lower end G of the electrode, bent at a right angle, has been considerably reduced.

The elements are arranged in series in an exceedingly simple manner by threading on an insulating tube H first a positive electrode, then an insulating washer I, then a negative electrode and a conducting washer J, and so on. Then there is passed into the tube H a rod screw-threaded at its ends, and by means of nuts insulated on one face the whole unit is tightened, so that the ends G of the negative electrodes press firmly on the positive electrodes E.

The general arrangement is as shown in the diagram Fig. 1.

The point of greatest resistance of the circuit where the largest quantity of heat is produced due to the passage of alternating current is the point of contact of the end G of the negative electrodes with the positive electrodes E. This point constitutes the hot junction which may be kept warm in any suitable manner.

The efficiency of this transformer is considerably greater than that of thermo-electric piles because the heat is localized in the hot junction. It varies with the outputs but normally reached 13 to 15% in lieu of 8%. The device is set in operation instantaneously. Immediately on passage of alternating current continuous current is produced. All the thermo-electric couples may be utilized like all the alternating currents. It is sufficient to regulate their voltage to the desired value.

The improved transformer permits in wireless telephony and telegraphy of dispensing completely with accumulators and piles both for heating the filaments and also for the voltage plate, and requires no modification of any wireless station. Its weight is very slight and its simplicity permits of production at a low price. Wear and tear is practically nil.

I claim:—

1. An electric converter for the static transformation of alternating or variable current into continuous non-fluctuating current, including a thermo-electric pile so connected in circuit with the source of variable current, that the two junctions of each element of the pile are in series relatively to the variable current going through them, the hot junctions being of greater ohmic resistance than the cold junctions and the continuous difference of potential across the poles of said pile being maintained non-fluctuating.

2. An electric converter for the static transformation of alternating or variable current into continuous non-fluctuating current, including a thermo-electric pile having the hot junctions of greater resistance than the cold junctions, said pile being arranged in a Wheatstone bridge assembly as shown in the drawing in which the source S of variable current is arranged in series with a diagonal L, the continuous current circuit being formed by the other diagonal M, the four arms $A^1$, $A^2$, $B^1$, $B^2$ being of equal ohmic resistance and containing respectively in series the same number of thermo-electric couples all connected in the same sense relatively to the terminals of the continuous current circuit and the contacts of hot junctions of these couples being of greater ohmic resistance than the cold contacts or junctions.

3. An electric converter as claimed in claim 2 in which the elements of the couples in series or positive elements E and negative elements F are formed of metal plates of different character characterized by this that these plates are formed with an opening by which they may be threaded on the same insulating rod or tube, the positive electrode E and the negative electrode F of the same couple being insulated from one another along the rod or tube by an insulating washer I and in electric contact by a bent end G of the negative electrode F which bears on the surface of the positive electrode E, and two adjacent couples being connected together electrically and maintained at the desired distance apart by means of conducting washers J threaded over the insulating tube or rod.

In witness whereof, I have hereunto set my hand this 25th day of May, 1925.

PIERRE MAX RAOUL SALLES.